Figure 1:
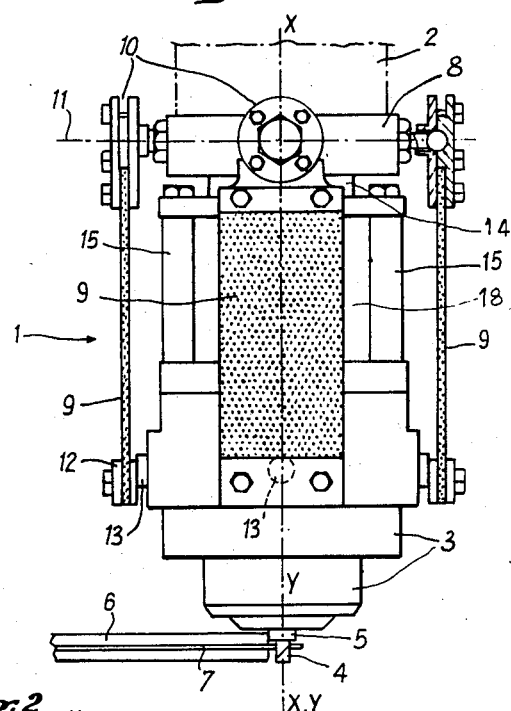

United States Patent [19]

Dumargue et al.

[11] Patent Number: 4,718,798
[45] Date of Patent: Jan. 12, 1988

[54] ELASTICALLY CONNECTED, TWO-PART TOOL SUPPORT, PARTICULARLY FOR A ROBOT

[75] Inventors: Guy Dumargue, Boulogne; Jean-Yves Huellec, Fontenay-Aux-Roses, both of France

[73] Assignee: Societe Nationale Industrielle Aerospatiale, Paris, France

[21] Appl. No.: 819,597

[22] Filed: Jan. 17, 1986

[30] Foreign Application Priority Data

Jan. 24, 1985 [FR] France ................... 85 01013

[51] Int. Cl.$^4$ ............................................. B23C 1/16
[52] U.S. Cl. ........................................ 409/97; 408/714; 409/110; 409/231; 901/41; 901/45
[58] Field of Search ............... 408/127, 147, 151, 179, 408/187, 714, 143, 150, 155, 159; 409/141, 231, 238, 200, 201, 211, 97, 110, 291; 901/15, 16, 28, 29, 41, 45

[56] References Cited

U.S. PATENT DOCUMENTS

| | | | |
|---|---|---|---|
| 2,761,298 | 9/1956 | Jarvis | 408/127 |
| 4,098,001 | 7/1978 | Watson | 901/45 X |
| 4,155,169 | 5/1979 | Drake et al. | 901/45 X |
| 4,221,514 | 9/1980 | Pavlovsky | 409/291 |
| 4,242,017 | 12/1980 | DeFazio | 901/41 |
| 4,338,052 | 7/1982 | Lockett | 408/714 X |
| 4,547,101 | 10/1985 | Dowdakin, Sr. | 408/127 |

FOREIGN PATENT DOCUMENTS 0036912 10/1981 European Pat. Off. .

*Primary Examiner*—Z. R. Bilinsky
*Attorney, Agent, or Firm*—Fisher, Christen & Sabol

[57] ABSTRACT

This invention relates to a tool support, particularly for a robot, of the type comprising two parts connected together by an assembly of elastic plates which, at rest, are disposed tangentially to a circle concentric to a reference axis of said robot with which the axis of the tool merges, and which, when working, enable that part of said support which bears the tool to move with respect to said reference axis, wherein each of said plates is connected to one of said parts of the tool support via a swivel joint assembly or the like and to the other of said parts via an articulation whose axis is at right angles to said reference axis. The invention is more particularly applicable to automatic machining with displacement of the tool parallel to itself.

7 Claims, 3 Drawing Figures

U.S. Patent     Jan. 12, 1988     4,718,798

ELASTICALLY CONNECTED, TWO-PART TOOL SUPPORT, PARTICULARLY FOR A ROBOT

The present invention relates to a tool support, particularly for a robot.

Known machining robots are known to be lacking in precision and rigidity, with the result that, when they are used for machining operations, such as milling or routing, it is indispensable to guide the work tool by applying said tool, or an element which is fast therewith, on a master template.

It is an object of the present invention to provide a tool support, particularly for a machining robot, which makes it possible to maintain contact with such a template, independently of the efforts and lack of precision of the robot's displacement.

It will be noted that such a tool support must allow the following operations:

maintaining the axis of the tool parallel to itself, despite the imprecision of displacement of the robot;

presenting a sufficiently large clearance to simplify programmation by apprenticeship of the robot;

withstanding the working forces;

limiting the forces of contact on the template; and being as compact as possible.

To these ends, according to the invention, the tool support, particularly for a robot, of the type comprising two parts connected together by an assembly of elastic plates which, at rest, are disposed tangentially to a circle concentric to a reference axis of said robot with which the axis of the tool merges, and which, when working, enable that part of said support which bears the tool to move with respect to said reference axis, is noteworthy in that each of said plates is connected to one of said parts of the tool support via a swivel joint assembly or the like and to the other of said parts via an articulation whose axis is at right angles to said reference axis.

It will be noted that EP-A- No. 0 036 912 already discloses a tool support for robot, of the type comprising two parts connected together by an assembly of elastic plates which, at rest, are disposed tangentially to a circle concentric to a reference axis of said robot with which the axis of the tool merges and which, when working, enable said part of the support which bears the tool to move with respect to said reference axis. However, in this prior art document, the robot is intended for assembling and not for machining, with the result that, when the elastic plates are deformed, the axis of the tool may incline with respect to the reference axis. This is even recommended when the tool support of this prior art is intended, for example, for introducing pins into holes. In that case, this tool support structure makes it possible to compensate the imprecise positions of the robot. Furthermore, in this known tool support, the elastic plates are connected rigidly to the tool support parts.

On the other hand, in the tool support according to the present invention, it is absolutely indispensable that the machining tool moves so that its axis remains parallel to the reference axis, for the work to be carried out correctly. This is obtained thanks to the swivel joint assembly or the like and to said articulations.

In the tool support according to the invention, four elastic plates are advantageously provided, parallel in two's and diametrically opposite in two's.

Said elastic plates are preferably sufficiently rigid to compensate the efforts resulting from the displacements of a guide, connected to the tool, in abutment on a template. These elastic plates may be made of composite material, constituted by resistant fibers (glass, carbon, . . . ) coated with a synthetic resin.

In that case, it is necessary, in order to take up any torsional moment of the tool during a plane-on-plane displacement (particularly in the case of a milling tool), to provide, between the tool and the robot, an Oldham coupling. Such a coupling enables the axis of the tool to move in two orthogonal directions of a plane orthogonal with respect to said tool axis.

Furthermore, in order to limit the forces of contact between the template and the corresponding guide provided on the tool support, it is advantageous to provide a ball bearing or the like between said guide and that part of said tool support which bears said tool.

In an advantageous embodiment, the motor driving the tool in rotation is mounted on that part of said support which bears said tool, in the space defined between said plates. In that case, the Oldham coupling must be disposed between that part of said support bearing said motor and that part of said support connected to the robot.

The invention will be more readily understood on reading the following description with reference to the accompanying drawings, in which:

FIG. 1 is a view in elevation, with parts torn away, of an embodiment of the tool support according to the invention.

Figure 2:
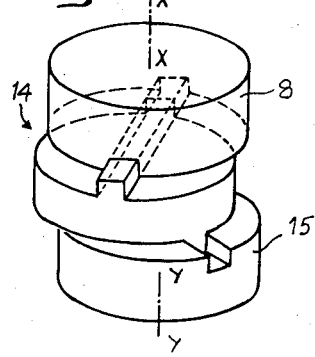

FIG. 2 schematically illustrates a known Oldham coupling.

Figure 3:
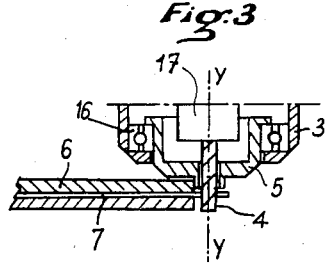

FIG. 3 is a partial view in section of the assembly of the guide of the tool with respect to said tool support.

In these Figures, identical references designate like elements.

Referring now to the drawings, the embodiment of a tool support according to the invention, shown in FIG. 1, bears reference 1. It is adapted to be fixed on the hand 2 of a robot, represented by chain-dotted lines. This hand 2 presents a reference axis X—X.

The tool support 1 bears a part 3 adapted to bear a tool 4, for example a milling tool for routing. This part 3 presents an axis Y—Y and is associated with a cylindrical guide 5, disposed concentrically to tool 4. The guide 5 is adapted to cooperate with a template 6 in order to enable tool 4 to machine workpiece 7 with precision.

At rest, axis X—X of hand 2 and axis Y—Y of part 3 merge.

The tool support 1 further comprises a part 8 adapted to be fixed to the hand 2 in any known manner (not shown).

Parts 3 and 8 of the support 1 are connected to each other by four elastic plates, parallel in two's and diametrically opposite in two's. When axes X—X and Y—Y merge, the four plates 9 are disposed tangentially to a circle concentric to axis X—X of said hand 2. In their upper part, the four plates 9 are connected to part 8 of the tool support via swivel joint fittings 10. In FIG. 1, the fitting 10 to the far right has been shown in section to reveal its structure. The fittings 10 may oscillate in all directions about axes 11 merged in two's, and orthogonal in two's and with respect to axis X—X.

In their lower part, plates 9 are connected to part 3 of the tool support via fittings 12 articulated about shafts 13 whose axes are orthogonal to axis X—X.

According to a particular feature of the invention, the plates 9 are made of composite material and compensate the efforts due to the displacement of the tool 4 when the guide 5 is in abutment on the template 6.

In order to take up any torsional moment brought about by the rotation of the tool 4 about its axis Y—Y, the tool support according to the invention may comprise an Oldham coupling.

FIG. 2 schematically shows such a coupling 14. The latter enables axis Y—Y of the tool to move in two directions at right angles to each other and at right angles to axis X—X of the tool support.

This coupling 14 may be mounted between the upper part 8 of the tool support and a structure 15 fast with the lower part 3.

Furthermore, as shown in FIG. 3, a ball bearing 16 or the like may be provided between guide 5 and part 3.

The forces of friction between template 6 and guide 5 may thus be limited.

The motor 18 for driving tool 4 in rotation may be borne directly by the lower part 3 and fixed thereon via the structure 15. In that case, its shaft may drive the tool-holder 17 and therefore tool 4 directly.

Under these conditions, it will be noted that a particularly compact embodiment is obtained.

The embodiment of the invention illustrated in the Figures more particularly concerns routing. It goes without saying that the present invention is not limited to this particular application.

FIG. 1 shows the embodiment at approximately half-scale. With this embodiment, the axis of the tool Y—Y may move over a cylinder of about 15 mm radius, whilst remaining constantly parallel to itself.

This large amplitude facilitates programmation by apprenticeship.

As a safety precaution, it is limited by mechanical stops (not shown in the Figures).

What is claimed is:

1. A tool support for a robot having a reference axis, said tool support supporting a tool having a tool axis and said tool axis having to be permanently parallel to said reference axis, and further said tool support comprising:
   a first part rigidly connected to said robot;
   a second part support supporting a motor capable of driving said tool through rotation and supporting a guide for guiding said tool along a template, and
   a plurality of elastic blades which are disposed around said motor and around said reference axis and parallel thereto and which connect said first and second parts and with which, when said motor is rotated, said tool merges and which enables, when rotation of said motor is ceased, said second part to move with respect to said reference axis, each of said plurality of elastic blades being connected to one part of said first and second parts via a swivel joint assembly and to the other part of said first and second parts via an articulation which axis is of right angles to said reference axis.

2. The tool support of claim 1 wherein said plurality of elastic blades are four elastic blades which are generally parallel to said reference and tool axes and which are disposed generally about orthogonal angles on center to each other as determined from said reference and tool axes.

3. The tool support of claim 1, wherein said elastic blades are sufficiently rigid to compensate displacements of said guide, connected to said tool, in abutment on said template.

4. The tool support of claim 3, wherein said elastic blades are made of composite material.

5. The tool support of claim 1 said guide is provided around said tool and a roll bearing is provided between said guide and said second part.

6. The tool of claim 5, wherein said roll bearing is a ball bearing.

7. The tool support of claim 1, wherein an Oldham coupling is disposed between said first and second parts.

* * * * *